United States Patent [19]
Kirby et al.

[11] Patent Number: 5,456,568
[45] Date of Patent: Oct. 10, 1995

[54] ARM MECHANISM

[76] Inventors: Jeffrey R. Kirby, 45 S. Ann St., Ventura; Troy E. Kirby, 690 Riverside Rd., Oak View, both of Calif. 93022

[21] Appl. No.: 172,950

[22] Filed: Dec. 27, 1993

[51] Int. Cl.⁶ .................................................. E02F 9/20
[52] U.S. Cl. .................. 414/722; 74/490.03; 414/917; 901/15; 901/28
[58] Field of Search ........................... 414/680, 685, 414/722, 917; 74/469, 479 R, 479 B, 479 BP, 479 BJ, 490.01, 490.03, 490.05, 479.01; 901/15, 23, 24, 25, 28

[56] References Cited

U.S. PATENT DOCUMENTS 4,435,120  3/1984  Ikeda et al. .................... 901/15 X
4,600,355  7/1986  Johnson ......................... 901/28 X

*Primary Examiner*—Donald W. Underwood
*Attorney, Agent, or Firm*—Jack C. Munro

[57] ABSTRACT

An arm mechanism to be operated at a proximal location to move a tool at a distal location. The arm mechanism includes an outer series of links and an inner series of links. Each series of links are connected together in an engaging relationship and in an in-line relationship with the outer series of links being pivotally mounted on the inner series of links. The arm mechanism is capable of being moved through almost three hundred and sixty degrees with the tool being movable in precise increments.

12 Claims, 3 Drawing Sheets

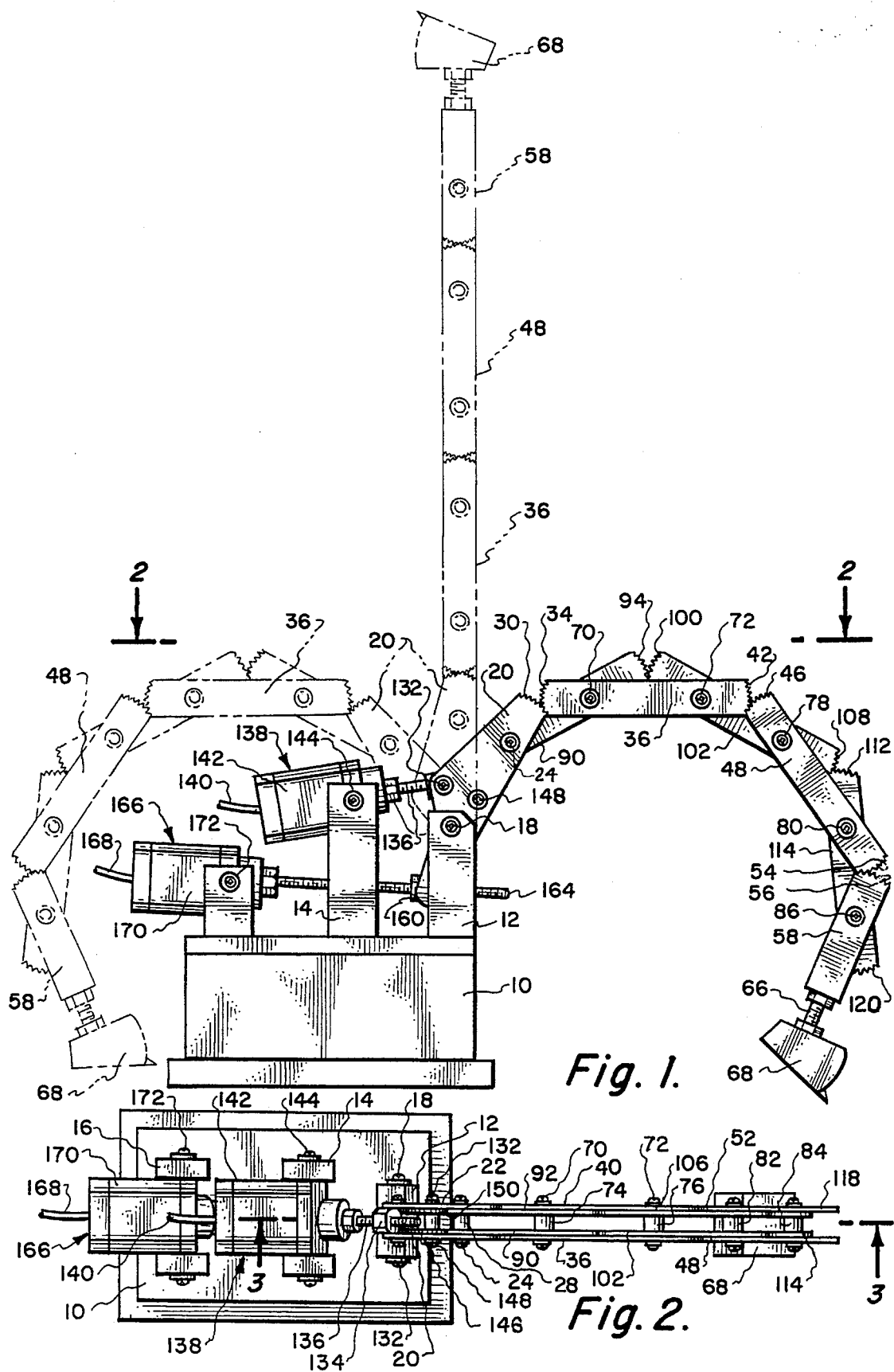

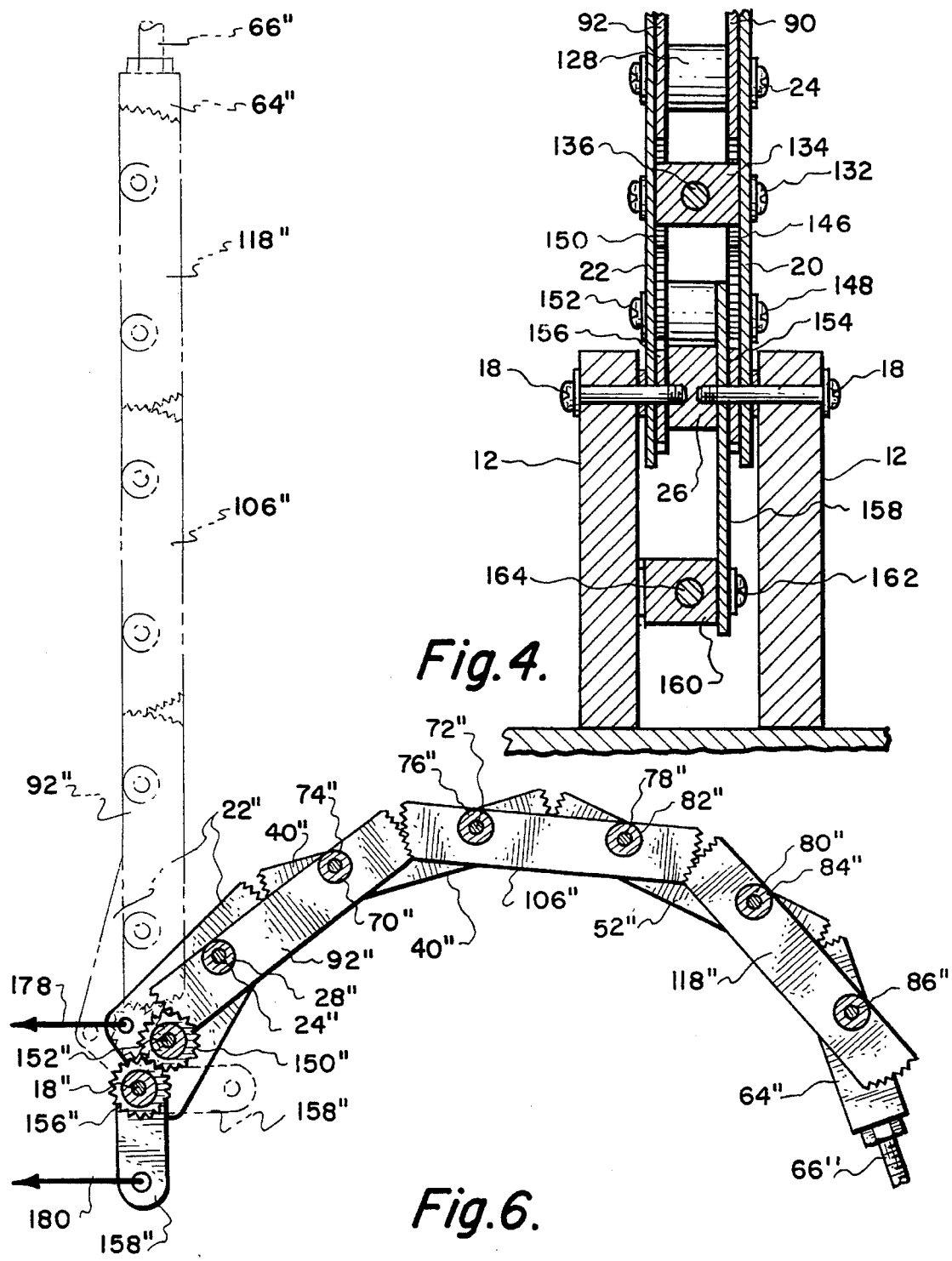

ARM MECHANISM

BACKGROUND OF THE INVENTION

1) Field of this Invention

The field of this invention relates to mechanisms and more particularly to an arm mechanism which facilitates the moving of a tool located at the distal end of the arm mechanism with the movement of the tool being affected from the proximal end of the arm mechanism.

2) Description of the Prior Art

Robotic types of arm mechanisms have long been known. One common use for such an arm mechanism would be in conjunction with an underwater vehicle. The arm mechanism would be located exteriorly of the vehicle but operated by one of the occupants of the vehicle in a manned submersible or by an operator located remotely in the case of an unmanned vehicle. The arm mechanism could be used for picking up specimens on the sea floor or possibly accomplishing some type of work, such as repair of some form of underwater structure. Similar types of arm mechanisms are used in other environments such as nuclear reactors.

In the constructing of any arm mechanism certain objectives must be met in order to achieve a satisfactory arm mechanism. One of these objectives is that the arm mechanism must be positive in its operation. When commands are given at the proximal location of the arm mechanism to perform certain functions, those functions are to be performed at the distal location of the arm mechanism. In other words, let it be assumed that commands are given to operate a shovel at the distal location and a shoveling action to occur at a specific area of the terrain. The operative movements at the proximal end must result precisely in that shoveling action at the desired location.

Another objective is that fine control of the tool is required. In other words when it is necessary for the tool to make only small movements in a particular direction, those small movements can be made from the operating mechanism at the proximal location.

Another objective of an arm mechanism is that it should be operable over a wide arm range. Some arm mechanisms of the prior art can only operate over a very limited range and of course the greater the range of operability, the greater the versatility of the mechanism.

Another objective of such an arm mechanism is to have the arm mechanism manufactured at a reasonable cost. In the past such arm mechanisms have been manufactured at an exceedingly expensive cost which greatly limits their usage.

SUMMARY OF THE INVENTION

One of the primary objectives of the present invention is to construct an arm mechanism which can be manufactured at a cost substantially less than known prior art mechanisms which therefore make the arm mechanism readily available for usage in certain installations that prohibited the use of certain prior art mechanisms because of their cost.

Another objective of the present invention is to construct an arm mechanism which can be finely controlled from the proximal location so that the tool as utilized can be precisely precisioned and perform its work with a high degree of control.

Another objective of the present invention is to construct an arm mechanism which is operable over an exceedingly wide range of area and actually the arm mechanism of the present invention is able to be used in any direction within three hundred and sixty degrees of the proximal location of the arm mechanism.

The arm mechanism of the present invention comprises an inner series of links which are joined together through a gearing arrangement at each end thereof. This inner series of links is in essence located in a single plane with operation of the most proximal link in the inner series of links causing certain movements to occur at the most distal end of the series of links. Connected to this inner series of links is an outer series of links with the outer series of links again being located in a single plane and located in an end-to-end, in-line relationship with these links being engagingly connected together also through a series of gear teeth. Each outer link is pivotally connected by a single pivot pin to one single inner link. At the distal end the tool could be connected to either the distal outer link or the distal inner link. At the proximal end for best operative control, movement of the proximal link on the inner series of links is accomplished by one motor with the separate motor control being used to operate the proximal end of the outer series of links. Each motor would result in movement of the tool located at the distal end.

BRIEF DESCRIPTION OF THE DRAWINGS

FIG. 1 is a side elevational view of the arm mechanism of the present invention depicting the range of movement of the arm mechanism;

FIG. 2 is a top plan view of the arm mechanism of this invention taken along line 2—2 of FIG. 1;

FIG. 4 is a cross-sectional view taken through line 4—4 of FIG. 3 showing more clearly the driving connection arrangement between the motors and the proximal links of both the inner and outer series of links;

FIG. 6 is a side elevational view similar to FIG. 4 but of a second modified form of arm mechanism of this invention.

DETAILED DESCRIPTION OF THE SHOWN EMBODIMENT

Figure 3:
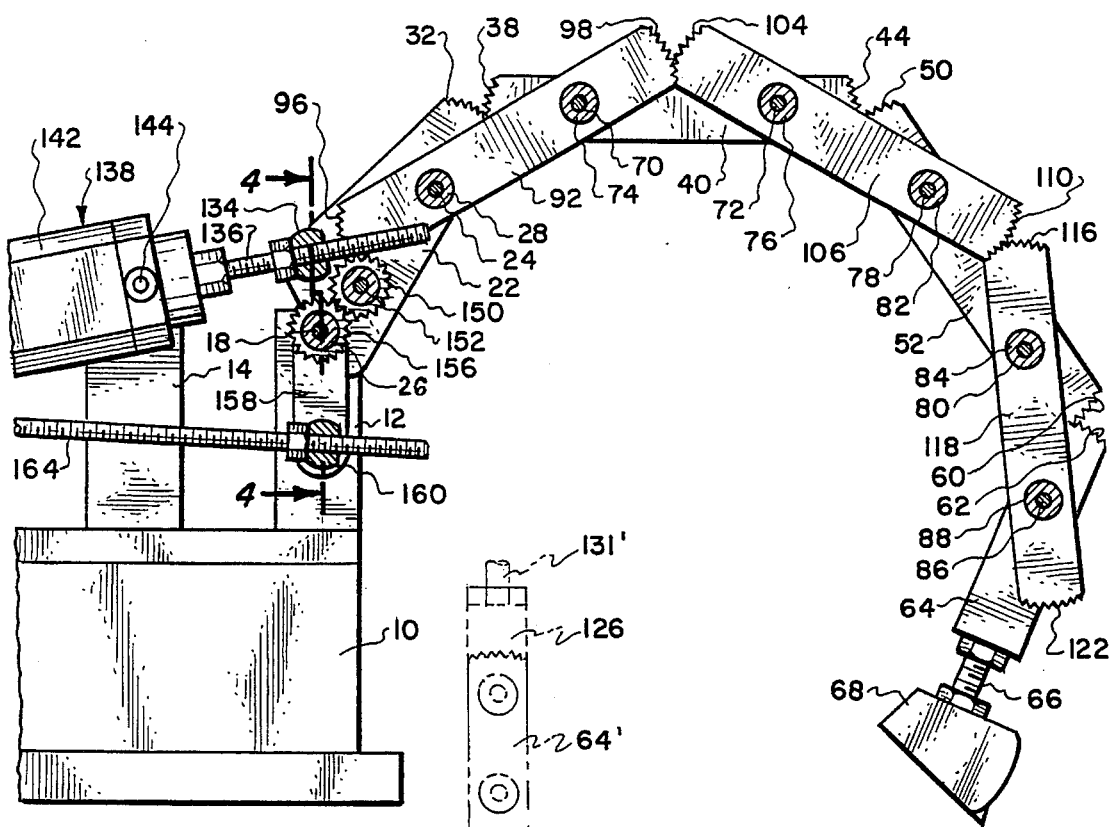
FIG. 3 is a cross-sectional view of the arm mechanism of the present invention taken along line 3—3 of FIG. 2.

Referring particularly to the drawings there is shown a base 10 on which are mounted base stanchions 12, 14 and 16. Each base stanchion 12, 14 and 16 actually comprise a pair of plates mounted in a spaced-apart manner. Pivotally mounted by a pivot pin 18 on base stanchion 12 are a pair of inner proximal links 20 and 22. Proximal links 20 and 22 are identical and operate together due to being fixed together by pivot pin 18 and pivot pin 24. Pivot pin 18 is located in a spaced relationship from pivot pin 24. The inner proximal links 20 and 22 are maintained in a evenly spaced-apart manner by means of spacer 26 which comprises part of the pivot pin 18 and spacer 28 which comprises a part of the pivot pin 24. The pivot pin 18 is actually two separate pins which are threadably secured into the spacer 26. In a similar manner the pivot pin 24 is actually two separate pins which are threadably secured into the spacer 28. It is to be understood that there could be more than two inner proximal links 20 and 22. As for example there could be three, four, five or six or however many, all located in an evenly spaced-apart manner and all functioning to move in unison.

The arm mechanism of this invention could utilize just one proximal link but in order to give the arm mechanism adequate lateral strength, it is desirable to utilize two inner proximal links 20 and 22. The pivot pin 24 is mounted at the center relative to the width of the proximal links 20 and 22.

The inner proximal link 20 terminates in a series of gear teeth 30 and its outer end. In a similar manner the inner proximal link 22 terminates in a series of gear teeth 32. The gear teeth 30 engage with gear teeth 34 of a intermediate inner link 36. The gear teeth 32 engage with gear teeth 38 of the intermediate inner link 40. The link 36 also includes a second series of gear teeth 42 with the inner link 40 including a second series of gear teeth 44. The gear teeth 42 engage with gear teeth 46 mounted on one end of an intermediate inner link 48. The gear teeth 44 operatively engage with gear teeth 50 of an intermediate inner link 52. The intermediate inner link 48 terminates in gear teeth 54 which operatively engage with gear teeth 56 of a distal inner link 58. The intermediate inner link 52 terminates in gear teeth 60 which operatively engage with gear teeth 62 of a distal inner link 64. Again links 64 and 58 are identical. Both links 54 and 58 are fixedly secured to a threaded fastener 66. The threaded fastener 66 is in turn fixedly mounted onto a tool 68. The tool 68 can comprise any common tool such as a shovel, a drill, a magnetic pickup device, etc.

Links 36 and 40 are connected together to operate in unison by means of a pair of pivot pins 70 and 72. Pivot pin 70 includes a spacer 74 with pivot pin 72 including a spacer 76. The links 48 and 52 are connected together and made to operate in unison by means of pivot pins 78 and 80. As part of the pivot pins 78 and 80 there are located spacers 82 and 84 respectively between the links 48 and 52. The distal links 58 and 64 are similarly connected together by a pivot pin 86 which includes a spacer 88.

It is to be noted that the inner links 20, 36, 48, and 58 are all connected in an end-to-end in-line relationship within a single plane. It is to be understood that the duplicate series of links 22, 40, 52, and 64 are also connected in the same manner and within a single plane.

Also pivotally mounted on the pivot pin 24 is a proximal outer link 90 with again an identical outer proximal link 92 being also mounted on the pivot pin 24 and located in a spaced relationship on either side of the spacer 28. The outer proximal link 90 has a set of inner gear teeth which are not shown and also a set of outer gear teeth 94. The outer link 92 has at one end gear teeth 96 and at the opposite end gear teeth 98. The outer proximal links 90 and 92 were also pivotally mounted on the pivot pin 70.

The gear teeth 94 operatively engage with gear teeth 100 of an intermediate outer link 102. The gear teeth 98 operatively engage with gear teeth 104 of an intermediate outer link 106. Links 102 and 106 are located again in an evenly spaced-apart manner and mounted on pivot pins 72 and 78 with the respective spacers 76 and 82 being located therebetween. The link 102 also includes gear teeth 108 with link 106 terminating in its outer end in gear teeth 110. Gear teeth 108 operatively engage with gear teeth 112 of a distal outer link 114. Gear teeth 110 operatively engage with gear teeth 116 of a distal outer link 118. The distal outer links 114 and 118 are pivotally mounted on the pivot pins 80 and 86 and located in an evenly spaced-apart manner therebetween with again their spacers 84 and 88 maintaining the spacing.

Figure 5:
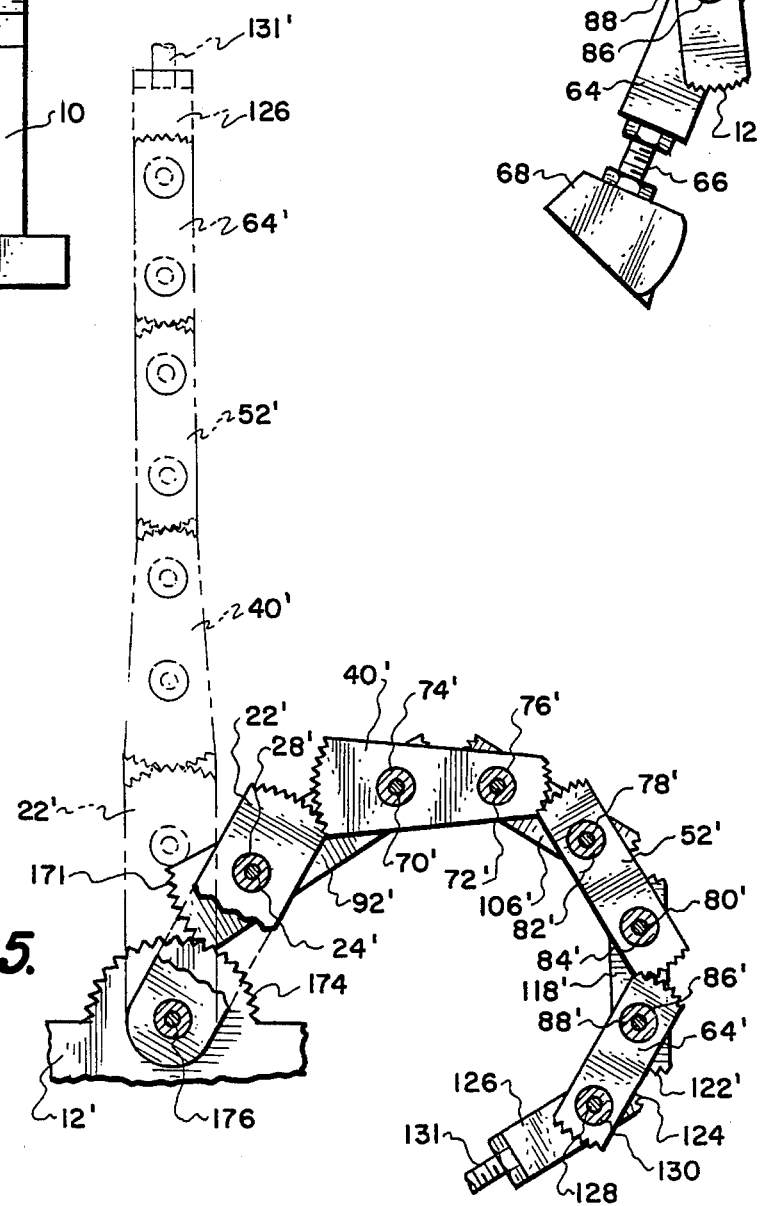
FIG. 5 is a side elevational view, partially in cross section, similar to FIG. 3 but of a first modified form of arm mechanism of this invention.

The outer links 90, 102 and 114 are again mounted in an end-to-end relationship within a single plane. In a similar manner the outer links 102, 106, and 118 are mounted within a single plane in an end-to-end relationship. Distal link 114 terminates also in a series of gear teeth 120 with distal link 118 terminating in a set of gear teeth 122. The gear teeth 120 and 122 are not being utilized within the embodiment of FIGS. 1 to 4 and FIG. 6. However, if additional links are added, gear teeth are utilized such as is shown in FIG. 5 where gear teeth 122' of link 118" operatively engages with gear teeth 124 of a distal link 126. Link 64' is pivotally connected by pivot pin 128 and spacer 130 to the distal link 126. It is the distal link 126 that is connected by the fastener 131 to the tool which is not shown in FIG. 5.

Regarding the embodiment in FIG. 5 it is basically similar in the linkage arrangement to the embodiment of FIG. 1 to 4 and like numerals have been utilized to refer to like parts. However, as previously mentioned it is to be noted that the distal link 126 has been added which shows that the tool 68 could be connected to either the outer series of links or the inner series of links. Also, it is to be understood that both this outer series of links and inner series of links can continue on for any desired number greater or less than what is shown in the drawings. Still further in FIG. 5 it can be seen that the spacing between directly adjacent pivot pins 24' and 70' is greater than the spacing between pivot pins 70' and 72'. This is just to represent that the spacing between the pivot pins can vary as well as length of the links can vary. It is to be noted that within FIGS. 1 to 4, the spacing between the pivot pins 24 and 70 is equal to the spacing between the pivot pins 70 and 72, and between the pivot pins 72 and 78, and between the pivot pins 78 and 80, and between the pivot pins 80 and 86.

Mounted on both proximal links 20 and 22 by means of a pivot pin 132 is a pivot block 134. Block 134 is capable of freely pivoting relative to the proximal links 20 and 22. Threadably mounted within the block 134 is a threaded shaft 136. Threaded shaft 136 is rotatable by a motor 138. The motor 138 is operated electrically by electrical power being supplied through electrical conductor 140. The motor 138 is confined within a motor housing 142 which is fixedly mounted by mounting pins 144 on base stanchion 14.

Rotatably mounted to the proximal link 20 and located between the proximal link 20 and the proximal link 22 is an idler gear 146. The idler gear 146 is mounted by the pivot pin 148. In a similar manner an identical idler gear 150 is pivotally mounted by pivot pin 152 to the proximal link 22. Idler gear 146 is in continuous engagement with the gear teeth (not shown) of link 90 with idler gear 150 being in continuous engagement with gear teeth 96 of link 92. Idler gear 146 is in continuous engagement with the drive gear 154 with idler gear 150 being in continuous engagement with the drive gear 156. The drive gears 154 and 156 are fixedly mounted on pivot pin 18. Also mounted on pivot pin 18 is an arm 158. Arm 158 has mounted on the lower end thereof a pivot block 160. The pivot block 160 is freely pivotally mounted on the arm 158 by means of a pivot pin 162. Threadably engaged with the pivot block 160 is a threaded shaft 164. Shaft 164 is rotated by motor 166 which is electrically operated by electricity being supplied through a conductor 168. The housing 170 of the motor 166 is fixedly mounted by mounting pins 172 to base stanchion 16.

Operation of the motor 138 will cause the proximal links 20 and 22 to pivot on the pivot shaft 18. This causes the proximal links to pivot relative to the links 36 and 40 which will cause the links 36 and 40 to assume a different angular position relative to the proximal links 20 and 22. The same is true between the links 36 and 40 to the respective links 48 and 52 and links 58 and 64. The result is by operation of the motor 138, the arm mechanism shown in FIG. 1 can move from the solid line position to the dotted line position.

Operation of the motor 166 all by itself will cause a similar movement to occur relative to the links 90, 92, 102, 106, 114, and 118 and also can cause the arm mechanism to move from the solid line position shown in FIG. 1 to the dotted line position. However, by operating of both motors 138 and 166 simultaneously, the movement from the solid line position in FIG. 1 to the dotted line position can be accomplished much quicker. Also because there are two separate motors utilized the degree of control for short, fine movements can be achieved as opposed to using only a single motor. As is readily apparent in FIG. 1, the motors 138 and 166 can be operated to cause the arm mechanism to assume a straight line configuration which is also shown in dotted lines in FIG. 1.

One difference of the embodiment shown in FIG. 5 is that it is intended to have only one motor to be connected to the link 22'. Link 92' has gear teeth 171 which connect with a gear 174. Gear 174 would be mounted on the base stanchion 12'. Proximal link 22' is pivotally mounted on the base stanchion 12' by means of a pivot pin 176. FIG. 5 is represents that a greater number of links could be utilized than what was shown in FIGS. 1 to 4 and that also the tool 68, as was previously discussed, could be connected to either the inner series of links or the outer series of links. Also FIG. 5 is shown in the drawings in order to substantiate that only a single motor could be utilized as opposed to the two-motor configuration shown in FIGS. 1 to 4. Also in FIG. 5, it can be readily seen that the link 22' is of a different width than link 40' with link 52' being again of a different width than link 40'. Therefore, variation in the width of the links is certainly permitted.

Referring particularly to FIG. 6 there is shown an arm mechanism similar to the arm mechanism in FIGS. 1 to 4. Arrow 178 is used to designate threaded shaft 136 with arrow 180 designating threaded shaft 164. The only real difference in the arm mechanism of FIG. 6 as opposed to FIGS. 1 to 4 is that the pivot pins 24", 70", 72", 78", 80", and 86" are not centrally mounted relative to the links 22", 92", 40", 106", 52", 118", and 64". These pivot pins are mounted directly adjacent one edge of these links. The reason for this is that when an arm mechanism is being designed to go only in a one hundred and eighty degree direction as opposed to a substantially three hundred and sixty degree direction as shown in FIGS. 1 to 4, then by locating of the pivot pins adjacent a side edge of the links will increase the movement in that particular direction. In other words the arm mechanism of FIG. 6 will be able to move closer to the base 10 than the arm mechanism of FIG. 1.

What is claimed is:

1. An arm mechanism for moving a tool located distally from a proximal location, said arm mechanism comprising:

a plurality of links divided into an outer series of links and an inner series of links, said outer series of links being located in a first plane, said inner series of links being located in a second plane, said first plane being parallel to and spaced from said second plane, each said link of said outer series of links being pivotally mounted by a pair of spaced-apart pivot pins on a directly adjacent pair of said links of said inner series of links, each said link of said outer series of links terminating in first longitudinal opposite ends, each said first longitudinal opposite end having first engaging means, a said first engaging means of one said link being in engagement with said first engaging means of another said link;

each said link of said inner series of links terminating in second longitudinal opposite ends, said links of said inner series of links being connected together in an in-line relationship by second engaging means; and a said link of said inner series of links and a said link of said outer series of links being located at said proximal location, movement means connecting at said proximal location for moving of said inner series of links and said outer series of links, said movement means comprising a pair of motors with one said motor being connected to said inner series of links and the other said motor being connected to said outer series of links, said inner series of links and said outer series of links terminating at a distal location, said tool being attached to said links at said distal location, whereby operation of said movement means causes said tool to move.

2. The arm mechanism as defined in claim 1 wherein:

said first engaging means comprising gear teeth, said second engaging means comprising gear teeth.

3. The arm mechanism as defined in claim 1 wherein:

said pivot pins being centrally mounted relative to the width of said outer series of links.

4. The arm mechanism as defined in claim 3 wherein:

said pivot pins being centrally mounted relative to the width of said inner series of links.

5. The arm mechanism as defined in claim 1 wherein:

said links of said outer series of links being identical in configuration.

6. The arm mechanism as defined in claim 1 wherein:

the distance between each directly adjacent pair of said pivot pins varying within said outer series of links.

7. An arm mechanism for moving a tool located at a distal location from a proximal location, said arm mechanism comprising:

a base;

an inner series of links connected together in an end-to-end manner with said inner series of links starting with an inner proximal link and ending with an inner distal link, said inner proximal link being pivotally mounted on said base, pivotal movement of said inner proximal link causes movement of said tool;

an outer series of links connected together in an end-to-end manner with said outer series of links starting with an outer proximal link and ending with an outer distal link, each link of said outer series of links being pivotally mounted on a link of said inner series of links, each link of said outer series of links being pivotally mounted on a pair of directly adjacent links of said inner series of links;

said proximal inner link and said proximal outer link being located at said proximal location, said proximal inner link and said distal outer link located at said distal location, said tool being mounted at said distal location; and movement means being connected at said proximal location, said movement means causing said tool to move, said movement means comprising a pair of motors with there being one said motor being connected to said inner series of links and the remaining said motor being connected to said outer series of links.

8. The arm mechanism as defined in claim 7 wherein:

said links of said inner series of links being connected together by a series of gear teeth with there being a separate said gear teeth connection arrangement between directly adjacent links, said outer series of links being connected together by a series of gear teeth with there being a separate gear teeth connection established between directly adjacent links of said outer series of links.

9. The arm mechanism as defined in claim 7 wherein:
pivotally mounting of said outer series of links on said inner series of links being accomplished by a plurality of pivot pins.

10. The arm mechanism as defined in claim 9 wherein:
said pivot pins being evenly spaced apart.

11. The arm mechanism as defined in claim 9 wherein:
said pivot pins varying in spacing.

12. The arm mechanism as defined in claim 9 wherein:
said pivot pins being centrally mounted relative to the width of both said outer series of links and said inner series of links.

* * * * *